United States Patent
Kobayashi et al.

(10) Patent No.: US 7,357,104 B2
(45) Date of Patent: Apr. 15, 2008

(54) INTERNAL COMBUSTION ENGINE PISTON CRANK MECHANISM

(75) Inventors: Makoto Kobayashi, Fujisawa (JP); Kenshi Ushijima, Kamakura (JP); Katsuya Moteki, Tokyo (JP); Hideaki Mizuno, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 11/717,957

(22) Filed: Mar. 14, 2007

(65) Prior Publication Data

US 2007/0215132 A1 Sep. 20, 2007

(30) Foreign Application Priority Data

Mar. 15, 2006 (JP) ............... 2006-070226

(51) Int. Cl.
*F02B 75/04* (2006.01)
(52) U.S. Cl. ................ 123/78 E; 123/48 B; 123/197.4
(58) Field of Classification Search .............. 123/78 E, 123/78 F, 48 B, 197.4
See application file for complete search history.

(56) References Cited

U.S. PATENT DOCUMENTS 6,684,828 B2 * 2/2004 Ushijima et al. ......... 123/48 B

2006/0137629 A1 * 6/2006 Mizuno et al. .......... 123/48 B

FOREIGN PATENT DOCUMENTS

JP 2004-124776 4/2004

* cited by examiner

*Primary Examiner*—Hieu T. Vo
*Assistant Examiner*—Katrina B. Harris
(74) *Attorney, Agent, or Firm*—Osha Liang LLP

(57) ABSTRACT

A piston crank mechanism has an upper link coupled to a piston by a piston pin, a lower link having a crankpin journal, wherein the crankpin journal is coupled to a crankpin of a crankshaft and is coupled to the upper link by an upper pin, and a control link is coupled to an eccentric cam of a control shaft that is supported by an engine block and coupled to a control pin boss by a control pin. The crankpin journal of the lower link is arranged and dimensioned relative to the upper pin such that a projection area defined by projecting the width of the upper pin along a direction line passing through a center of the piston pin and a center of the upper pin does not obscure an area defined by the crankpin during operation of the crankshaft as viewed in an axial direction of the crankpin.

16 Claims, 6 Drawing Sheets

Figure 3
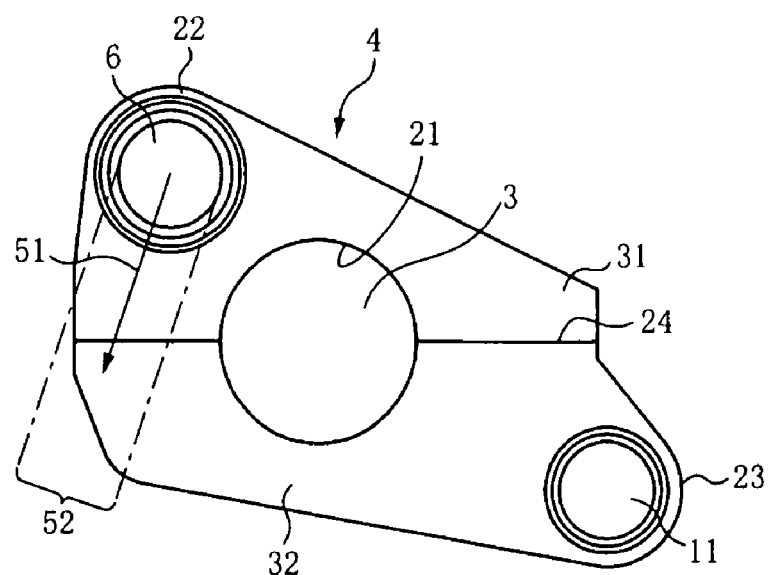
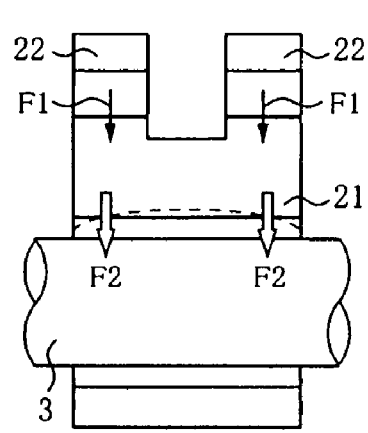
Figure 4(a)
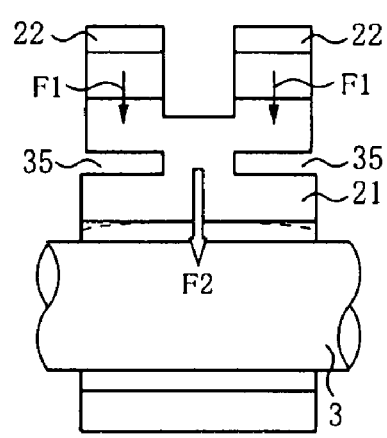
Figure 4(b)
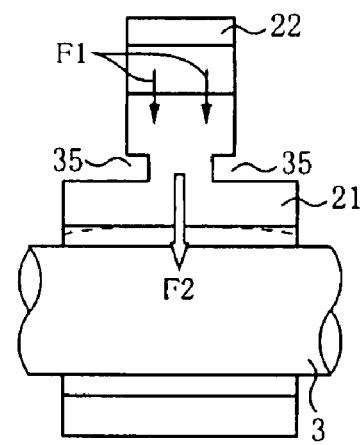
Figure 4(c)

INTERNAL COMBUSTION ENGINE PISTON CRANK MECHANISM

CROSS REFERENCES TO RELATED APPLICATIONS

This application claims priority from Japanese Patent Application Serial No. 2006-070226 filed Mar. 15, 2006, the entire contents of which is incorporated herein by reference.

TECHNICAL FIELD

The present invention relates to a piston crank mechanism, and in particular, to a compound link type piston crank mechanism.

BACKGROUND

Piston pins and crankpins of a reciprocating internal combustion engine may be linked by a compound link type piston crank mechanism. The compound link type piston crank mechanism generally has an upper link linked to the piston pins of the pistons, a lower link that links the upper link and the crankshaft crankpins, and a control link, one end of which is supported such that it can rock on the engine, and the other end of which is linked to the lower link. The upper link and the lower link are rotatably linked or coupled to each other through an upper pin, and the control link and the lower link are rotatably linked or coupled to each other through a control pin.

The lower link in the compound link type piston crank mechanism receives the combustion pressure to which the pistons are subjected through the upper link, and transmits the force to the crankpins by a "lever" type action using the control pins as fulcrums.

The maximum combustion gas force to which a lower link is subjected by a piston is input from the upper pin bearing through the piston pins, the upper link, and the upper pins. The load and inertial forces are counterbalanced by a load that is also generated in the crankpin journal and control pin bearing.

The load received from the upper pins is often off center or tilted and can be directed toward the crankpins, such that offset deformation of the upper pin bearing may be leveraged by the length of the upper link and adversely affects the crankpin journal.

SUMMARY

In one or more embodiments of the present invention, a piston crank mechanism for an internal combustion engine has an upper link (sometimes referred to as a connecting rod) for each piston in each cylinder of the engine. The upper link has a first end operably coupled to a piston by a piston pin. The piston crank mechanism also has a lower link having a first end, a second end, and a crankpin journal arranged therebetween. The crankpin journal is rotatably coupled to a crankpin of a crankshaft, and the first end is arranged with an upper pin boss to be operably coupled to a second end of the upper link by an upper pin. The piston crank mechanism further has a control link having a first end operably coupled to an eccentric cam of a control shaft that is supported by an engine block, and a second end operably coupled to a control pin boss arranged at the second end of the lower link by a control pin. The crankpin journal of the lower link is arranged and dimensioned relative to the upper pin such that a projection area defined by projecting the width of the upper pin along a direction defined by a line passing through a center of the piston pin and a center of the upper pin does not obscure an area defined by the crankpin during operation of the crankshaft as viewed in an axial direction of the crankpin.

BRIEF DESCRIPTION OF THE FIGURES

FIG. 3 shows the relative positions of the lower link and upper link according to one or more embodiments of the present invention.

FIG. 4(a)-(c) show load transmission paths according to different embodiments of the present invention.

DETAILED DESCRIPTION

Figure 1:
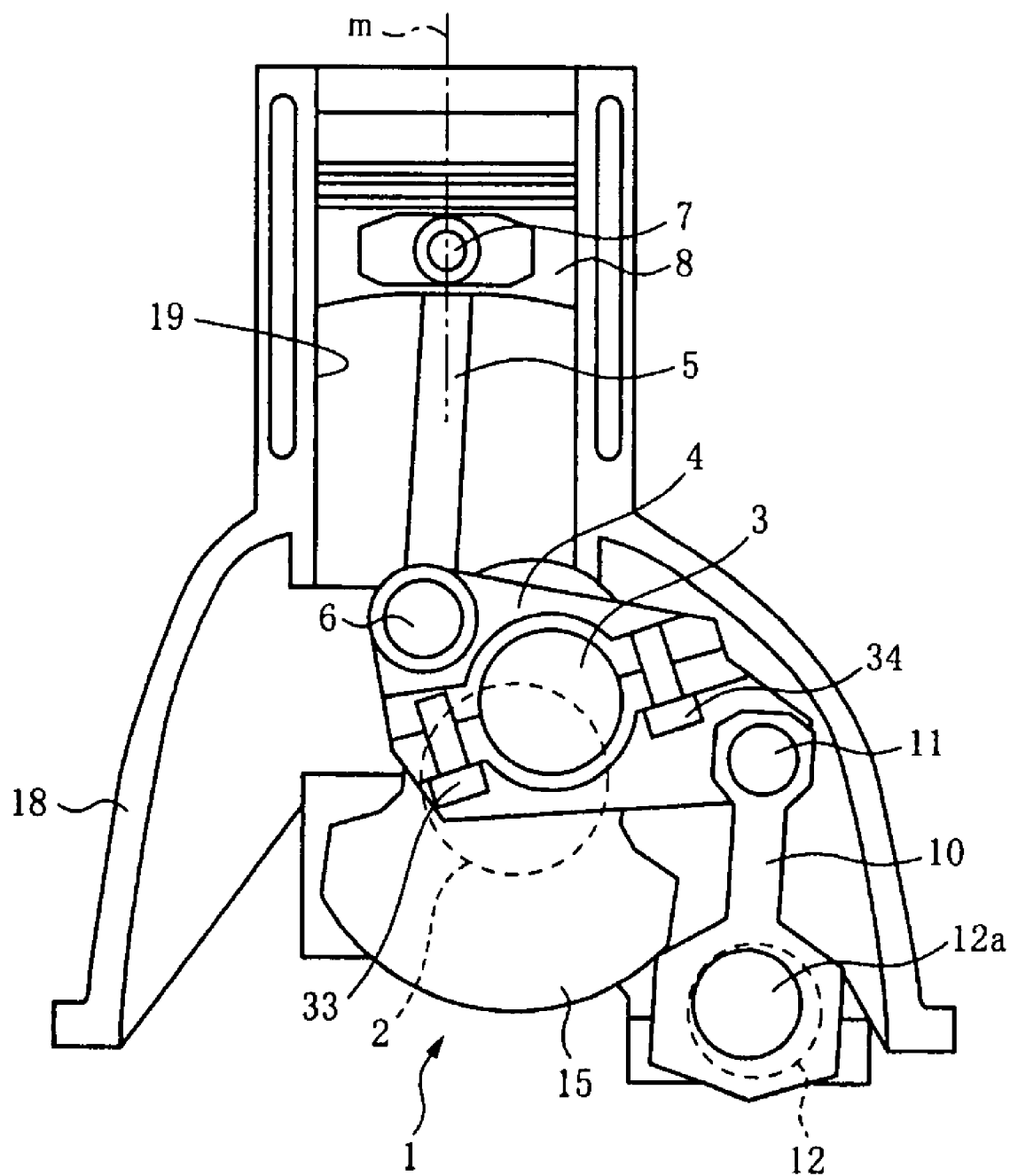
FIG. 1 is a cross-sectional diagram showing a piston crank mechanism in which a lower link according to one or more embodiments of the present invention is used.

Alternative embodiments of the present invention will now be described with reference to the drawings. Like items in the drawing figures are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, the lower link is made up of two parts, a top lower link and a bottom lower link. The top lower link and the bottom lower link interface along abutting surfaces that passes through the center of the crankpin journal and that are fastened to each other with multiple bolts. The construction of the lower link being made up of two halves facilitates simple assembly onto the crankshaft. In one or more embodiments of the present invention, the multiple bolts are inserted from below, that is, from the bottom lower link, and threaded into internal threads in the top lower link.

One or more embodiments of the present invention may usefully decrease the effect of deformation on the crankpin journal caused by the force on the pin boss acting upon the upper pin. One or more embodiments of the present invention may usefully facilitate providing a lubricating oil film on the crankpin.

Figure 9:
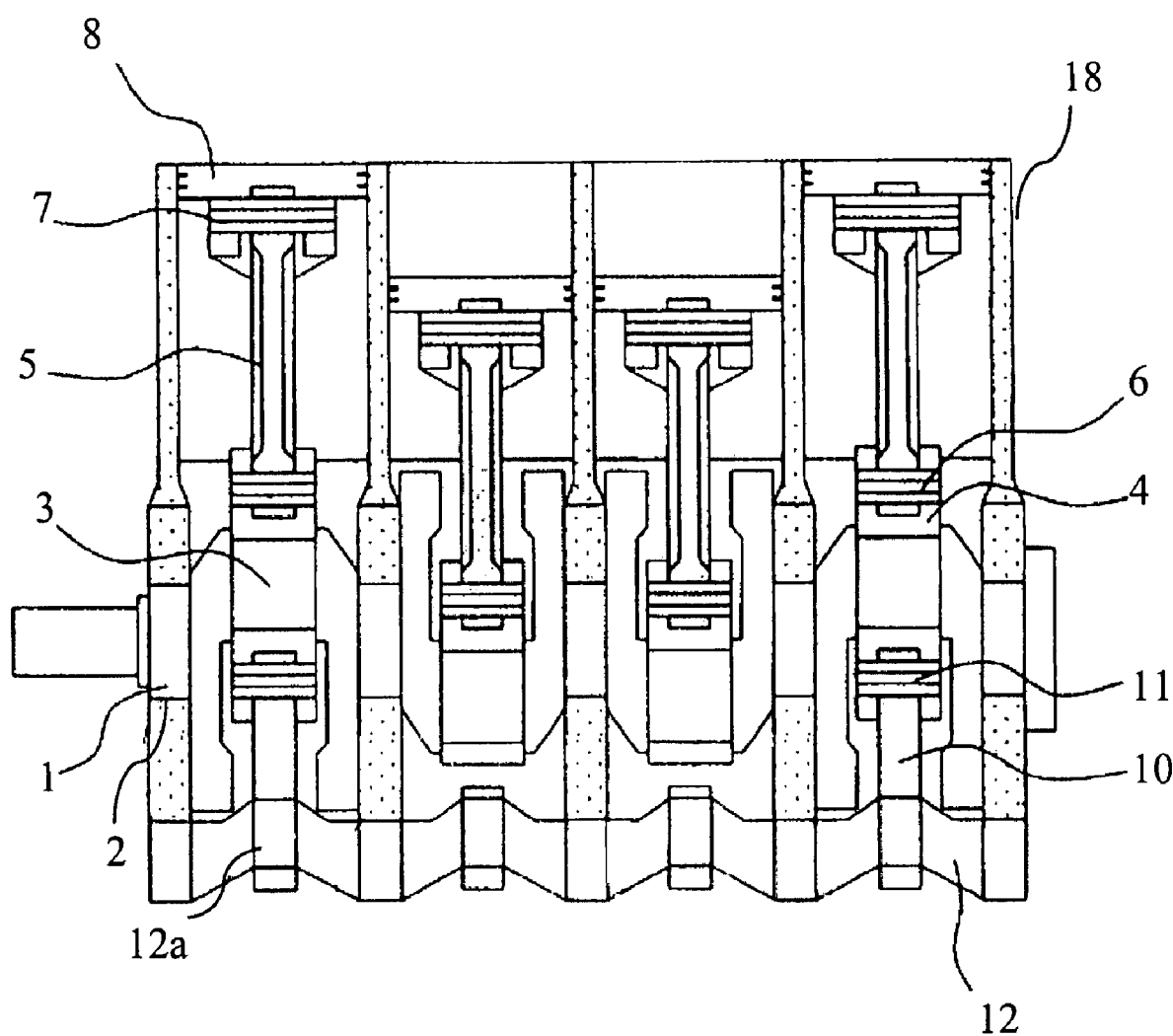
FIG. 9 is a cross section, in the axial direction of the crankshaft, of the piston crank mechanism shown in FIG. 1.

FIG. 1 is a cross-sectional diagram showing a compound link type piston crank mechanism with a variable compression ratio mechanism according to one or more embodiments of the present invention. FIG. 9 is a cross-sectional diagram, the cross section taken along the crankshaft axis of the piston crank mechanism shown in FIG. 1. This mechanism provides a compound link type piston crank mechanism having a lower link 4, an upper link 5 and a control link 10 as the principal elements.

Crankshaft 1 has at least one and typically has multiple journals 2 and crankpins 3, and the journals 2 are rotatably supported on main bearings of a cylinder block 18 of an engine. The crankpins 3 are offset by a prescribed amount from journals 2, and lower links 4 are rotatably linked or coupled to the crankpins 3. Counterweight 15 extends on the opposite side from crankpins 3 of a crank web that connects journals 2 and crankpins 3. While one or more embodiments of the present invention may be described for purposes of clarity in connection with one piston crank mechanism associated with one cylinder 19, one piston and one crank pin, it may be understood by those skilled in the art that the same description may be applied to multiple cylinders, pistons, crankpins and piston crank mechanisms.

The lower link 4 is made up of two members as described below, and the crankpins 3 also fit into a crankpin journal 21 approximately in the center of the lower link 4.

A lower end of upper link 5 is rotatably linked or coupled to one end of lower link 4 by an upper pin 6, and an upper end is rotatably linked or coupled to a piston 8 by a piston pin 7. The piston 8 is subjected to combustion pressure and reciprocates inside cylinder 19 of cylinder block 18.

A control link 10 restricts the movement of the lower link 4. An upper end of the control link 10 is rotatably linked or coupled to the other end of lower link 4 by a control pin 11 and a lower end of control link 10 is rotatably linked or coupled to the lower part of cylinder block 18, which is a part of the engine, through a control shaft 12. Specifically, the control shaft 12, which is rotatably supported on the engine, has an eccentric cam part 12a that is offset from a center of rotation of control shaft 12, and the lower end of the control link 10 is rotatably fitted onto the eccentric cam part 12a. The eccentricity of the eccentric cam part 12a of the control shaft 12 may be used to adjustably control the compression of the engine. The rotational position of the control shaft 12 is controlled by a compression ratio control actuator (not shown) that operates based on control signals from an engine control unit (not shown). This rotates the cam and thereby controls the compression ration The center line m of the cylinder 19, as shown, is relatively greatly offset to the opposite side from control pin 11, relative to the center of rotation C of crankshaft 1.

In a variable compression ratio mechanism that uses a compound link type piston crank mechanism as described above, when the control shaft 12 is rotated by the compression ratio control actuator, the position of the center of eccentric cam part 12a, in particular the position relative to the engine, changes. Because of this, the rocking support position of the lower end of control link 10 changes. When the rock support position of the control link 10 changes, the stroke of piston 8 changes and the position of piston 8 at the piston top dead center (TDC) becomes higher or lower. This can affect the engine compression ratio.

Figure 2:
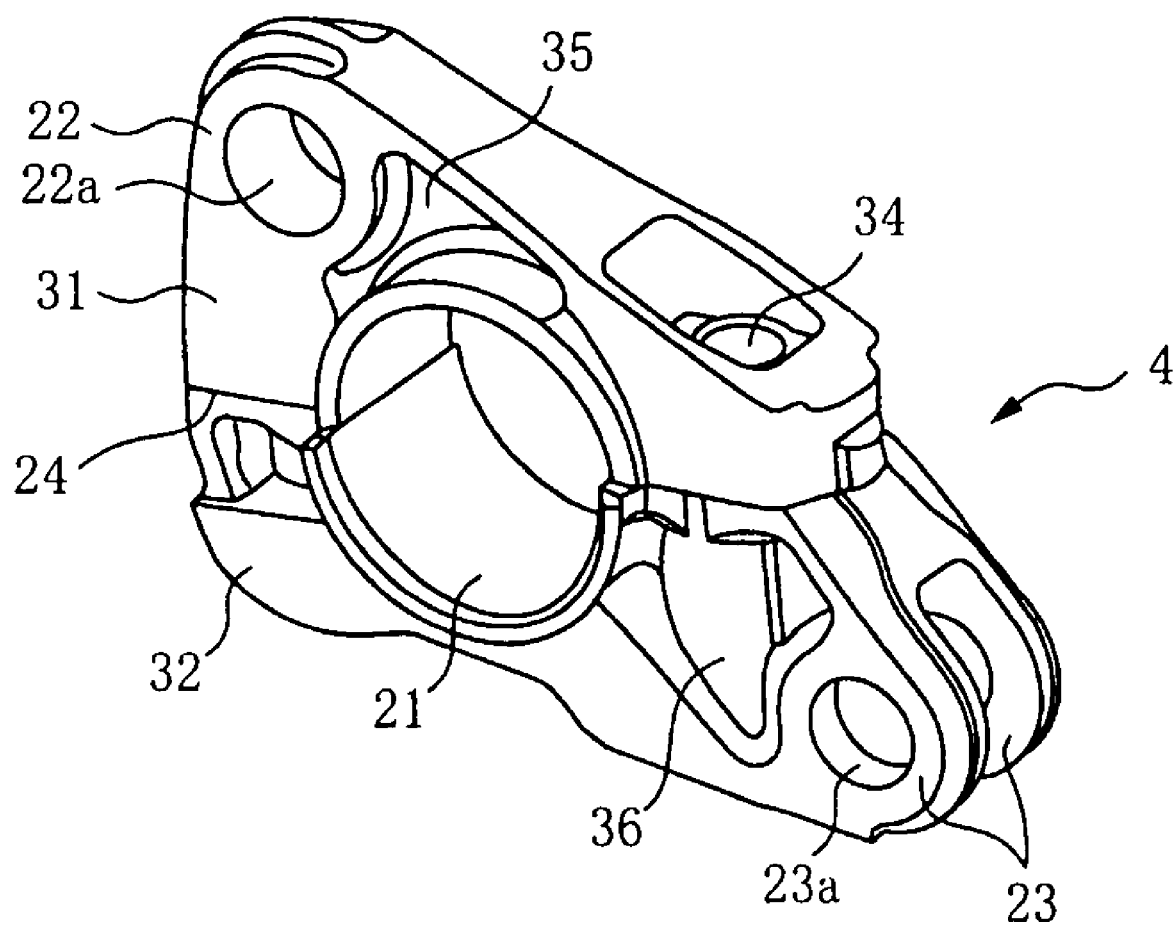
FIG. 2 is a perspective view of a lower link according to an embodiment of the present invention.

Next, the lower link 4 according to an embodiment of the present invention will be explained based on FIG. 2. FIG. 2 is a perspective view of lower link 4. Lower link 4 has a crankpin journal 21, into the approximate center of which fits the crankpin 3, an upper pin boss 22 at one end that holds the upper pin 6, and a control pin boss 23 at the other end that holds the control pin 11. For purposes of assembly onto crankpins 3, the lower link 4 is divided along a divided surface 24 that passes through the center of the crankpin journal 21, into a top lower link 31 that includes the upper pin boss 22 and a bottom lower link 32 that includes the control pin boss 23, and the top lower link 31 and bottom lower link 32 are fastened together to form the lower link 4 as a unified part with bolts 33 and 34 (refer to FIG. 1) disposed on either side of crankpin journal 21. Assuming, for purpose of clarity of discussion and not as a limitation as to a particular orientation of the engine or piston crank mechanism, that the cylinder 19 is vertically oriented above the crankcase, the top lower link 31 is positioned in the crankcase toward the top of the crank case and the bottom lower link 32 is positioned in the crankcase toward the bottom of the crankcase, and the bolts 33 and 34 can both be fastened from the underside of the crankcase.

An upper pin 6 is rotatably held in upper pin hole 22a of the upper pin boss 22. The region surrounding an upper pin bearing that fits at a lower end of upper link 5 between the upper pin 6 and the upper pin hole 22a, is forked or bifurcated, and the mating upper pin boss 22 of lower link 4 can rotate inside the forked or bifurcated region.

A control pin boss 23 that has a control pin hole 23a into which control pin 11 is rotatably inserted is forked or bifurcated, and the mating control pin boss 23 at one end of control link 10 can rotate inside the fork.

The bolts 33 and 34 are respectively passed through bolt insertion holes (not shown) in bottom lower link 32, and their ends are threaded or screwed into an internal thread portion 61 formed in top lower link 31. Since the internal thread portion 61 for bolt 33 near upper pin boss 22 extends toward upper pin boss 22, its end is closed off. In contrast, the internal thread portion for bolt 34 near control pin boss 23 passes through top lower link 31, and as shown in FIG. 2, the end of bolt 34 protrudes slightly from an opening at the top end of the internal thread portion.

A recess 35 is formed in the lower link 4 to separate upper pin boss 22 and crankpin journal 21, and the thickness of the recess 35 (thickness in the axial direction of the crankpin) is smaller than the thickness of the lower link 4 at the crankpin journal 21 (dimension of crankpin journal 21 in the axial direction). Note that with this embodiment, the same type of recess 36 is also formed between crankpin journal 21 and control pin boss 23.

FIG. 3 shows the relative positions of lower link 4 and upper link 5 constituted according to one or more embodiments of the present invention. Arrow 51 in FIG. 3 indicates the lengthwise direction of upper link 5, that is, the direction of a line passing through the center of piston pin 7 and the center of upper pin 6, and a space in which the width or outer diameter of upper pin 6 is projected in the direction of arrow 51 is represented as area 52. When crankshaft 1 rotates, both lower link 4 and upper link 5 rock, so that the direction of the arrow 51 and the position of area 52 change. Here, the relative position when arrow 51, and thus area 52, are closest to crankpin 3 is shown. As shown in the figure, since the area 52 is positioned to the side of crankpin 3, the area 52 and crankpin 3 do not interfere with each other. In other words, an area created by projecting the upper pin 6 along a direction of a line passing through the center of the piston pin 7 and the center of the upper pin 6 does not overlap the crankpin journal 21 during operation.

Therefore, the load from upper pin 6 acting on lower link 4 in the direction of arrow 51 is always directed away from crankpin journal 21, and any deformation of crankpin journal 21 caused by deformation of upper pin boss 22 can be minimized. Thus, one or more embodiments of the present invention may be useful for reducing deformation of the crankpin journals acting on the crankpin. To realize the relative positions shown in FIG. 3, the distance between the axes through upper pin 6 and crankpin 3 must necessarily be large, and from this standpoint as well, mutual deformation effects will be small for the two bearings. The location of the crankpin journal may near the center of the lower link, and although the position thereof may be evenly spaced it is not necessarily evenly spaced between the upper pin and the control pin bosses.

FIG. 4(a)-(c) are explanatory diagrams showing the load transmission paths in a cross section through upper pin 6 and crankpin 3. The load acts from upper pin 6 as shown by arrow F1 during explosive combustion, and the load is transmitted to crankpin 3 as shown by arrow F2. FIG. 4(c) shows one embodiment of the present invention, in which load F2 acts primarily at the axial center of the length of crankpin journal 21. The load transmission path is narrow because of the recesses 35 on both sides, so that load F2 is concentrated in the axial center of the length, and the load acting on the two ends of crankpin journal 21 will be small. Therefore, deformation of the two ends of crankpin journal 21 can be reduced, and edge contact against crankpin 3 is avoided, and loss of the lubricating oil film can be avoided. Further, load F2 can be reliably maintained at the center, where lubricating oil film pressure is high.

Further, because the divided surface 24 between top lower link 31 and bottom lower link 32 is approximately perpendicular to the direction of maximum loading from upper link 5, the shear force applied to bolts 33 and 34 is small.

Figure 5:
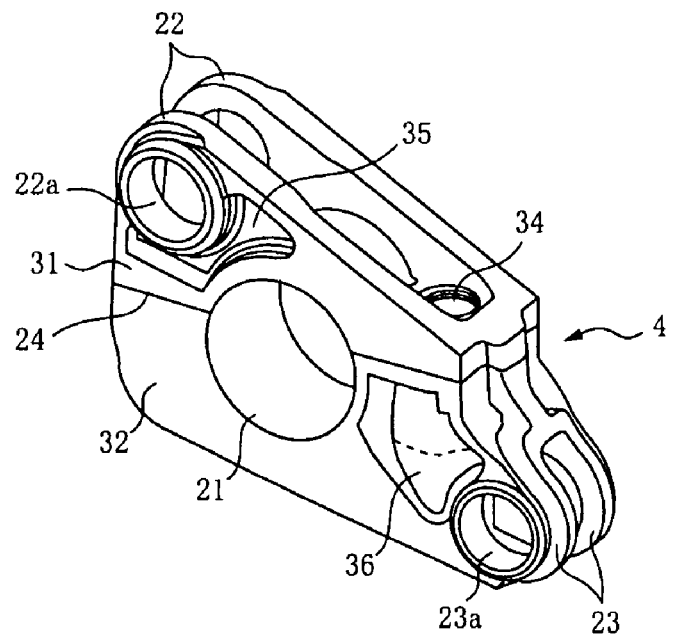
FIG. 5 is a perspective view of a lower link according to an embodiment of the present invention.
Figure 6:
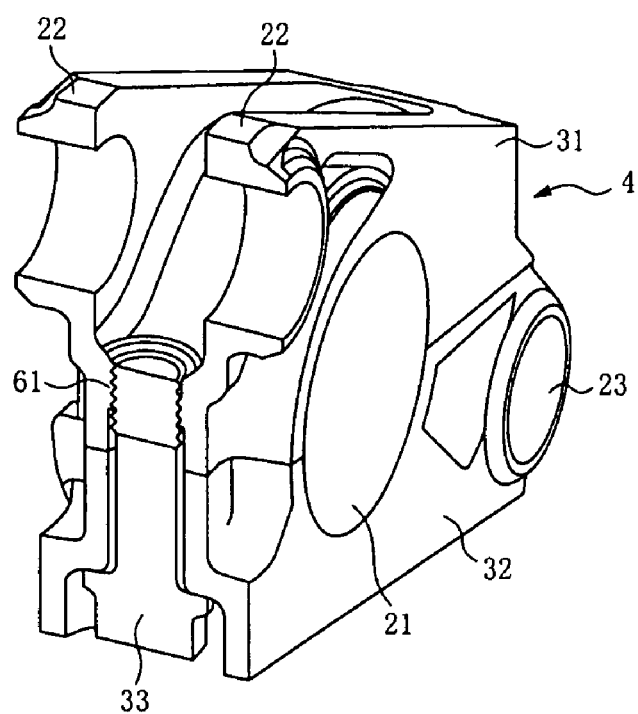
FIG. 6 is a cut away perspective view of a lower link according to one or more embodiments of the present invention, the cut away taken along the center of one of the bolts.
Figure 7:
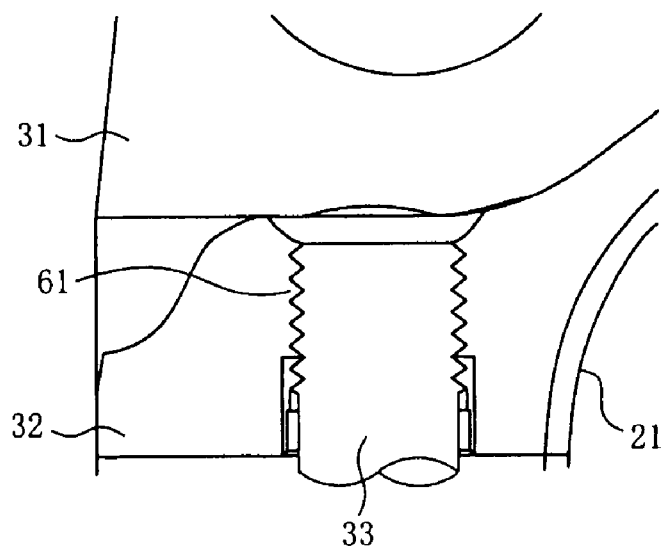
FIG. 7 is a partial cross-sectional view showing meshing with the internal thread portion.

FIGS. 5-7 show a lower link 4 according to one or more embodiments of the present invention. Here, upper pin boss 22 is forked to support both ends of upper pin 6, and the lower end of upper link 5 is held inside the fork. The weight of upper link 5 can thus be reduced. Further, since upper pin boss 22 is bifurcated, the internal thread portion 61 in top lower link 31 corresponding to bolt 33 passes vertically through top lower link 31, and its upper end is open at the bottom surface of a recessed portion between the bifurcations. The end of bolt 33 reaches the open end of the internal thread portion 61, and, when viewed axially, the threads of bolt 33 mesh with all of the threads of internal thread portion 61.

The lower link 4 thus constructed usefully moderates stress concentrations in the internal thread portion 61 at the position corresponding to the end of the bolt 33, and durability is improved.

Additionally, recesses 35 and 36 are formed in the end faces on either sides of lower link 4, and the width of the load transmission path is narrowed.

Therefore, as can be seen in the load transmission path shown in FIG. 4(b), despite the fact that the overall length in the axial direction of upper pin boss 22 is greater, load F2 will still act primarily at the center of crankpin journal 21, as in FIG. 4(c) described above, because of recess 35, and deformation at the two ends and lubrication defects are minimized. FIG. 4(a) shows the load transmission path in a lower link without a recess 35. In this case, a large amount of force F2 is transmitted to the two ends of crankpin journal 21 from upper pin boss 22 that is forked, so that deformation at the two ends will be larger, such that loss of the lubricating oil film may occur, and there is a risk of edge contact.

Figure 8:
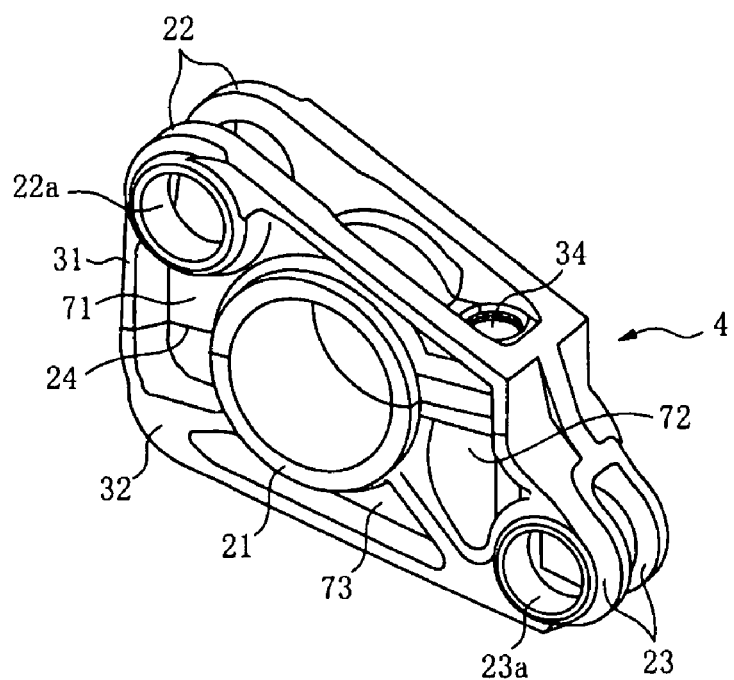
FIG. 8 is a perspective view showing a lower link according to an embodiment of the present invention.

FIG. 8 shows lower link 4 according to one or more embodiments of the present invention. The lower link 4 has a forked upper pin boss 22. Here, recesses 71, 72, and 73 are formed over a wider range in the two side surfaces of lower link 4, and the recesses 71, 72, and 73 surround the entire periphery of crankpin journal 21. Therefore, deformation of the two ends of crankpin journal 21 caused by loading from upper pin 6 or control pin 11 is more reliably decreased, and edge contact can be prevented.

While the invention has been described with respect to a limited number of embodiments, those skilled in the art, having benefit of this disclosure, will appreciate that other embodiments can be devised which do not depart from the scope of the invention as disclosed herein. It should be understood that the present invention is not limited by the embodiments described above, and various modification are possible without departing from the technical concept in the claims. Accordingly, the scope of the invention should be limited only by the attached claims.

What is claimed is:

1. A piston crank mechanism for an engine having a piston in a cylinder, the piston crank mechanism comprising:
   an upper link having a first end operably coupled to a piston by a piston pin;
   a lower link having a first end, a second end, and a crankpin journal arranged therebetween, wherein the crankpin journal is rotatably coupled to a crankpin of a crankshaft, and the first end is arranged with an upper pin boss to be operably coupled to a second end of the upper link by an upper pin; and
   a control link having a first end operably coupled to an eccentric cam of a control shaft that is supported by an engine block and a second end operably coupled to a control pin boss arranged at the second end of the lower link by a control pin,
   wherein the crankpin journal of the lower link is arranged and dimensioned relative to the upper pin such that a projection area defined by projecting the width of the upper pin along a direction defined by a line passing through a center of the piston pin and a center of the upper pin does not obscure an area defined by the crankpin during operation of the crankshaft as viewed in an axial direction of the crankpin.

2. The piston crank mechanism of claim 1, wherein the crankshaft is offset from an axial centerline of the cylinder in a direction toward the control pin boss such that locations of the upper pin boss, the crankpin boss, and the control pin boss result in the projection area not being obscured by the crankpin of the crankshaft during operation of the crankshaft.

3. The piston crank mechanism of claim 1, wherein the lower link comprises:
   an upper portion having the upper pin boss formed therein; and
   a lower portion having the control pin boss formed therein; wherein
   the upper and lower portions are separate parts defined by a surface passing though a center of the crankpin journal, and
   the upper and lower portions are fastened with at least two bolts on opposing sides of the crankpin journal.

4. The internal combustion engine piston crank mechanism of claim 3, wherein The lower link comprises a part, between the crankpin journal and the upper pin boss, that is formed thinner than The crankpin journal in an axial direction of the crankpin of the crankshaft.

5. The internal combustion engine piston crank mechanism of claim 3, wherein the lower link comprises a part, between the crankpin journal and the control pin boss, that is formed thinner than the crankpin journal in an axial direction of The erankpin of the crankshaft.

6. The piston crank mechanism of claim 3, wherein the upper pin boss is formed in a bifurcated shape that supports each end of the upper pin.

7. The piston crank mechanism of claim 6, wherein
an internal thread portion configured to couple one of the at least two bolts that passes though the lower portion of the lower link is formed in a recessed portion of the bifurcated shape of the upper pin boss.

8. The piston crank mechanism of claim 7, wherein an end of the internal thread portion is open in the recessed portion, and substantially the all of the plurality of threads of the internal thread portion engage the bolt.

9. The piston crank mechanism of claim 7, wherein the lower link comprises a portion that is formed thinner than the crankpin journal in an axial direction of the crankpin.

10. The piston crank mechanism of claim 7, wherein an end of the internal thread portion is open in the recessed portion, and substantially the all of the plurality of threads of the internal thread portion engage the bolt.

11. A piston crank mechanism for an engine, the piston crank mechanism comprising:
an upper link connected to a piston pin at a first end of the upper link;
a lower link connected to a crankpin of a crankshaft, the lower link comprising an upper pin boss and a lower pin boss;
an upper pin connecting the upper pin boss to a second end of the upper link;
a lower pin connecting the lower pin boss to a second end of a control link, wherein a first end of the control link is coupled to an eccentric cam of a control shaft;
wherein the lower link is arranged such that during operation of the engine, the width of the upper pin projected along a direction defined by a line passing through a center of the piston pin and a center of the upper pin does not intersect a cross-sectional area of the crankpin.

12. The piston crank mechanism of claim 11, wherein the lower link comprises:
an upper portion having the upper pin boss formed therein; and
a lower portion having the lower pin boss formed therein;
wherein the upper and lower portions mate together at a surface passing through a center of a crankpin journal.

13. The piston crank mechanism of claim 11, wherein the upper pin boss is formed in a bifurcated shape.

14. The piston crank mechanism of claim 11, wherein the lower pin boss is formed in a bifurcated shape.

15. A piston crank mechanism for an engine, the piston crank mechanism comprising:
an upper link means for connecting to a piston pin means at a first end of the upper link means;
a lower link means for connecting to a crankshaft, the lower link means comprising an upper pin boss means and a lower pin boss means;
an upper pin means for connecting the upper pin boss means to a second end of the upper link means;
a lower pin means for connecting the lower pin boss means to a second end of a control link means, wherein a first end of the control link means is coupled to a control shaft means;
wherein the lower link means is arranged such that a width of the upper pin means projected along a direction defined by a line passing through a center of The piston pin means and a center of the upper pin means does not intersect a cross-sectional area of a crankpin means of the crankshaft.

16. The piston crank mechanism of claim 15, wherein loads from the upper link means transfer though the lower link means to the control link means without acting upon a crankpin journal means of the lower link means.

* * * * *

UNITED STATES PATENT AND TRADEMARK OFFICE
CERTIFICATE OF CORRECTION

PATENT NO. : 7,357,104 B2 Page 1 of 1
APPLICATION NO. : 11/717957
DATED : April 15, 2008
INVENTOR(S) : Makoto Kobayashi et al.

It is certified that error appears in the above-identified patent and that said Letters Patent is hereby corrected as shown below:

In Claim 3, column 6, line 50, the word "though" should be --th<u>r</u>ough--.

In Claim 4, column 6, line 55, the word "The" should be --<u>t</u>he--.

In Claim 4, column 6, line 57, the word "The" should be --<u>t</u>he--.

In Claim 5, column 6, line 63, the word "The" should be --<u>t</u>he--.

In Claim 5, column 6, line 63, the word "erankpin" should be --<u>c</u>rankpin--.

In Claim 7, column 7, line 3, the word "though" should be --th<u>r</u>ough--.

In Claim 15, column 8, line 25, the word "The" should be --<u>t</u>he--.

In Claim 16, column 8, line 30, the word "though" should be --th<u>r</u>ough--.

Signed and Sealed this

Twenty-ninth Day of July, 2008

JON W. DUDAS
*Director of the United States Patent and Trademark Office*